United States Patent [19]

Yoshikawa

[11] Patent Number: 5,617,180
[45] Date of Patent: Apr. 1, 1997

[54] APPARATUS FOR CONVEYING PHOTOGRAPHIC FILM

[75] Inventor: Sumio Yoshikawa, Kanagawa, Japan

[73] Assignee: Fuji Photo Film Co., Ltd., Kanagawa, Japan

[21] Appl. No.: 499,772

[22] Filed: Jul. 6, 1995

[30] Foreign Application Priority Data

Jul. 7, 1994 [JP] Japan .................................. 6-155901
Jul. 7, 1994 [JP] Japan .................................. 6-155906
Jul. 7, 1994 [JP] Japan .................................. 6-155910

[51] Int. Cl.⁶ ............................................... G03B 27/46
[52] U.S. Cl. ............................................... 355/40
[58] Field of Search ........................... 355/40, 41; 354/105, 354/217, 218

[56] References Cited

U.S. PATENT DOCUMENTS

| | | | |
|---|---|---|---|
| 4,727,399 | 2/1988 | Matsumoto | 355/41 |
| 5,231,451 | 7/1993 | Uekusa et al. | 355/29 |
| 5,287,141 | 2/1994 | Yoshikawa | 355/40 |
| 5,438,389 | 8/1995 | Kito et al. | 355/38 |
| 5,473,402 | 12/1995 | Long et al. | 354/298 |

*Primary Examiner*—Arthur T. Grimley
*Assistant Examiner*—David A. Lane
*Attorney, Agent, or Firm*—Sughrue, Mion, Zinn, Macpeak & Seas

[57] ABSTRACT

An apparatus for conveying a photographic film is structured such that, when it is determined that an image frame does not exist, information indicating the image frame does not exist is recorded by a recording head onto a magnetic recording layer which corresponds to an image frame recording area. Accordingly, before the image frame is positioned at the subsequent processes for operation, by reading the information on the magnetic recording layer, it can be detected that the image frame does not exist in an image frame area. Further, it is not necessary to position the image frame area in which the image frame does not exist and only the image frame area in which an image frame exists are positioned for printing.

16 Claims, 14 Drawing Sheets

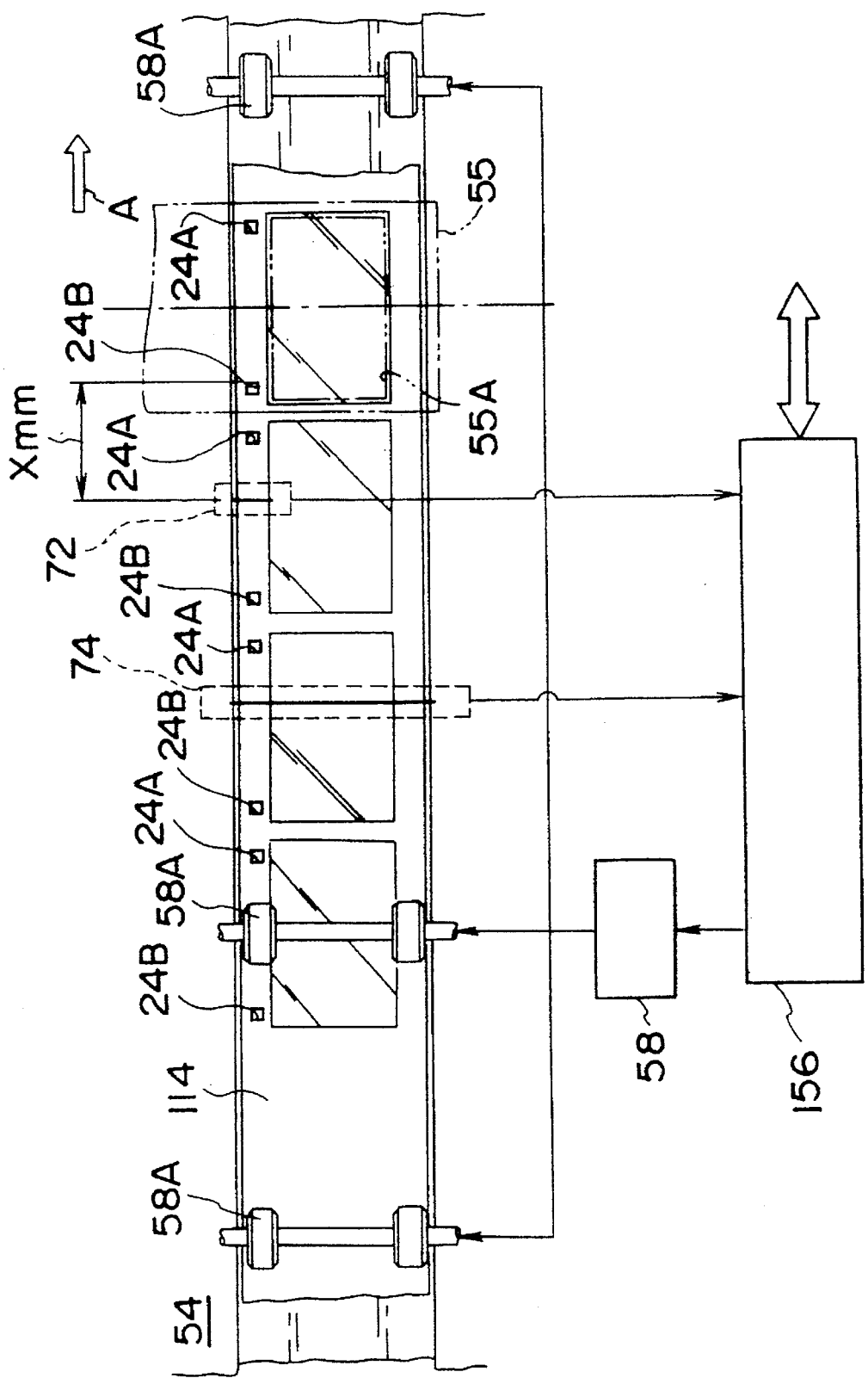

APPARATUS FOR CONVEYING PHOTOGRAPHIC FILM

BACKGROUND OF THE INVENTION

1. Field of the Invention

The present invention relates to an apparatus for conveying a photographic film, in which the photographic film includes perforations provided in advance at predetermined intervals and at which a predetermined number of perforations is provided with respect to the area of one image frame. Respective images of the photographic film are photographed so that relative positions between the perforation and the image are constant.

2. Description of the Related Art

Conventionally, in a 135 size negative film or the like, perforations (rectangular holes) are provided at a predetermined pitch in advance. When the negative film is loaded in a camera, the perforations engage with a sprocket or the like so that driving force is applied to the negative film. Further, the perforations correspond to a contact or the like provided at the camera and serve to indicate whether the negative film is accurately conveyed. When the film is conveyed by the camera, the initial positions, i.e., the position in which the film is loaded, varies. As a result, the relative positions between the perforation and the photographed image frame are not constant.

In a case in which the photographic film which was photographed is, for example, print processed by a printing device, it is necessary to position the respective image frames at a printing position.

In this case, there is no mark (indicator) which specifies the image frame. Accordingly, it is necessary to have a complicated control in which an edge of the first image frame is detected in accordance with density difference between the first image frame and a base portion. On the basis of the results of edge detection, a predetermined amount of frames are forwarded and positioned at the printing position.

However, in the aforementioned frame forwarding control, when the negative film is loaded in the camera, even if the frame is "advanced without exposure" (i.e., advanced so as to skip a frame or frames which are not to be exposed) for some reason and one frame area is unexposed, for example, the unexposed portion is positioned at the printing position. Then, the printing operation, and thereafter, the verifying operation are effected.

In this way, normal processing, such as print processing or the like, is effected in the portion (area) in which the processing is not required. Consequently, materials such as a printing material (e.g., a photographic printing paper) and hours of operation are wasted.

In recent years, it has been proposed that information can be magnetically recorded onto the negative film. In such a negative film, the perforations are provided in advance at predetermined intervals and the predetermined number of perforations are provided with respect to one image frame. As a result, the film is photographed so that the relative positions between the perforation and the image frame are constant.

Even in such a negative film, if the frame is advanced without exposure for some reason, the image is unexposed and the similar drawback arises.

Further, when the photographic film which was photographed is, for example, print processed by the printing device, the negative film may be separated from a cartridge called patrone (the patrone is discharged when the negative film is separated therefrom). In this case, a single negative film is conveyed or a plurality of connected negative films are conveyed, and the image frames are forwarded so as to be successively positioned at the printing position.

The negative film is conveyed in one direction. The negative film, in which print processing thereof has been completed, is conveyed out of the side opposite the side, into which the negative film is conveyed, with respect to the printing position. Moreover, the negative film, in which print processing thereof has been completed, is cut every predetermined number of frames (usually six frames). The film is then accommodated within a negative sheet with the film cut into piece negatives (a strip of negative film containing several frames), and thereafter, is returned to a customer.

Here, in recent years, film has been proposed in which a magnetic recording layer is provided, and information regarding the time at which the film is photographed, information regarding the time at which the film is print processed, and the like are recorded onto the magnetic recording layer. Even if the film has been developed and print processed, such photographic film is not cut every predetermined number of frames so as to prevent separation of the magnetic recording layer. In addition, the film is developed and printed without being separated from the cartridge, and thereafter, is rewound in the original cartridge. Consequently, when the film is returned to the customer, it has been considered in which the film is returned in a state in which the film is accommodated within the cartridge.

As a result, the magnetic recording layer is not separated. Further, it is possible to prevent a drawback in which the magnetic recording layer is scratched and the information thereon cannot be read or written.

The cartridge and the inner end portion of the photographic film which was wound in the cartridge in layers are temporarily engaged so that, as occasion demands, the photographic film can be separated from the cartridge. This is because in a case in which a large amount of photographic films are processed, it is more efficient to connect and process a plurality of photographic films than to process the films separately.

However, in a case in which the photographic film is print processed in a state in which the film is not separated from the cartridge, when the position of the last frame is not specified, the film is successively conveyed in the withdrawing direction of the photographic film. As a result, excessive force is applied to the temporarily-engaged portion between the rear end portion of the photographic film and the cartridge so as to-damage the temporarily-engaged portion.

With the aforementioned in view, an object of the present invention is to obtain an apparatus for conveying a photographic film, in which the existence of the image frame at a position onto which the image frame is to be recorded can be recognized in advance so that the unnecessary positioning of the image frame is eliminated, and the waste of material and time at the respective processes for operation can be omitted.

Another object of the present invention is to obtain an apparatus for conveying a photographic film, in which the position of the image frame can be easily searched, and the film can be reliably conveyed to the predetermined position while the image frame is positioned.

Still another object of the present invention is to obtain an apparatus for conveying a photographic film, in which, in a case in which the photographic film is withdrawn from the cartridge without being separated therefrom, the position onto which the last image frame is to be recorded is recognized, the withdrawal of the last image frame beyond the predetermined position is prohibited, and the damage at the engaging portion between the photographic film and the cartridge can be prevented.

SUMMARY OF THE INVENTION

The first aspect of the present invention is an apparatus for conveying a photographic film, in which the photographic film includes perforations formed at predetermined intervals and at which a predetermined number of perforations is provided with respect to the area of one image frame, when the photographic film, in which respective images are photographed so that relative positions between the perforation and the image are constant, is conveyed, image frames are forwarded so that the image frames are successively positioned at a predetermined position. The apparatus comprises; a conveying device which conveys the photographic film in a longitudinal direction; a perforation detection sensor which detects the perforations; a recognizing device which, on the basis of the positions of the perforations detected by the perforation detection sensor, recognizes the position onto which the image is to be recorded; an image frame determining device which determines as to whether the image frame exists at the position onto which the image is to be recorded; and a controller which, in a case in which the perforations corresponding to an image frame recording area which is determined by the image frame determining device that the image frame does not exist are detected by the perforation detection sensor, controls the conveying device such that positioning of the image frame recording area, which is determined that the image frame does not exist, at the predetermined position is canceled.

In accordance with the first aspect, the photographic film is photographed so that the relative positions between the perforation and the image frame are constant. Accordingly, by detecting the perforation, the position of the image frame can be recognized.

In a case in which the respective image frames are positioned at the predetermined position, for example, the printing device is positioned at the printing position, the perforations which correspond to the image frames are detected by the perforation detection sensor at first while the photographic film is conveyed by the conveying device so that the image frames are positioned at the predetermined position.

There could be a case in which the image frame is missing due to the advance-without-exposure of the separation by a camera or the like. The image frame determining device determines whether the image frame exists at a position onto which the image is to be recorded. If it is determined that the image frame does not exist at a position onto which the image frame is to be recorded, the controller controls the conveying device so that positioning of the image frame is canceled at a predetermined position of the image frame recording area.

As a result, wasteful time (time for forwarding frames) can be avoided. If, for example, the positioning of the image frame is canceled at the printing position for print processing, waste of a print-exposed printing material such as a photographic printing paper or the like can be eliminated.

The second aspect of the present invention is an apparatus for conveying a photographic film, in which the photographic film includes perforations formed at predetermined intervals and at which a predetermined number of perforations is provided with respect to the area of one image frame, the photographic film, in which respective images are photographed so that relative positions between the perforation and the image are constant, is conveyed. The apparatus comprises a conveying device which conveys the photographic film in a longitudinal direction; a perforation detection sensor which detects the perforations; a recognizing device which, on the basis of the positions of the perforations detected by the perforation detection sensor, recognizes the position onto which the image is to be recorded; an image frame determining device which determines as to whether the image frame exists at the position onto which the image is to be recorded; and a recording device which records the information in which the image frame does not exist onto a recording medium, on the basis of the perforations corresponding to the image frame recording area which is determined that the image frame does not exist.

In accordance with the second aspect, while the photographic film is conveyed by the conveying device, every time the perforations are detected by the perforation detection sensor, the image frame determining device determines whether the image frame exists at a position which corresponds to the perforations in the image frame recording area.

When it is determined that the image frame does not exist, on the basis of the perforations which correspond to the image frame recording area, the recording device records on the recording medium information indicating that the image frame does not exist. As a result, in a case in which the images of the photographic film (which are positioned every predetermined pitch) are forwarded at subsequent processes for operation, on the basis of the information read by the recording medium, the positioning of the image frame can be canceled in the area at which the image frame does not exist and the waste of time for positioning processing can be avoided.

In the third aspect of the present invention according to the above-described second aspect, the recording medium is a magnetic recording layer provided at the photographic film.

In accordance with the third aspect, the magnetic recording layer is provided at the photographic film. On the magnetic recording layer, information such as a shutter speed, and aperture size of a diaphragm, a place of being photographed or comments on the condition of being photographed when the film is photographed by the camera is recorded. The information is read at the processing laboratory. The amount of correcting exposure can be determined, and the above-described comments or the like can be printed over the images.

By recording onto the magnetic recording layer the information in which the image frame does not exist, the contents recorded on the magnetic recording layer are read before the respective processes for operation. Consequently, the existence of the image frame can be recognized at the respective processes for operation.

In the fourth aspect of the present invention according to the above-described second aspect, the recording medium is a memory card which is conveyed together with the photographic film to the respective processes for operation of the photographic film.

In accordance with the fourth aspect, an LSI card (the memory card) which corresponds to the photographic film is normally issued when the photographic film is brought into the laboratory in the laboratory process. The information verified after the photographic film is processed is recorded onto the LSI card, and thereafter, the card is conveyed to the respective processes for operation together with the photographic film.

If the information regarding the existence of the image frame (the information in which the image frame does not exist) is recorded onto the LSI card, positioning of the image frame in the area at which the image frame does not exist can be canceled at a print processing.

The fifth aspect of the Present invention is an apparatus for conveying a photographic film, in which the photographic film includes perforations formed therein at predetermined intervals and at which a predetermined number of perforations is provided with respect to one image frame, when the photographic film, in which respective images are photographed so that relative positions between the perforation and the image are constant, is conveyed, image frames are forwarded so that the image frames are positioned at a predetermined position. The apparatus comprises: a conveying device which conveys the photographic film in a longitudinal direction; a density detection sensor which detects density of the photographic film; an image frame determining device which, off the basis of tee density detected by the density detection sensor, determines whether the image frame exists at the position onto which the image is to be recorded: an perforation detection sensor which detects the perforations; an image frame position recognizing device which, on the basis of the relation of relative positions between like perforations and the image frame, recognizes the position of the image frame from the positions of the perforations detected by the perforation detection sensor; and a controller which, in a case in which it is determined by the image frame determining device that the image frame exists and the perforations corresponding to the image frame are detected, after the position of the image frame is recognized by the image frame position recognizing device, controls the conveying device such that the image frame is conveyed to and positioned at the predetermined position.

In accordance with the above-described fifth aspect, the photographic film is photographed so that the relative positions between the perforation and the image frame are constant. Accordingly, by detecting the perforations, the position of the image frame can be recognized.

In a case in which the respective image frames are at the predetermined position, e.g., the printing device is positioned at the printing position, the density of the photographic film is first detected by the density detection sensor while the photographic film is conveyed by the conveying means. From the detected results, the image frame determining means determines as to whether the image frame actually exists at a position onto which the image frame is to be recorded. Namely, the image frame could be missing due to the advance-without-exposure of the image frame operation by the camera or the like.

When the image frame determining device determines that the image frame exists, the perforation detection sensor detects the perforations which correspond to the image frame, and the image frame position recognizing means recognizes the position of the image frame, the controller controls the conveying device so that the image frame is positioned at the predetermined position.

Since the image frame is positioned at the predetermined position on the basis of perforations, it is not necessary to effect a complicated control, e.g., detection, determination and calculation of the edge of the image frame or the like. Thus, control of positioning can be easily effected. Moreover, since the frames are not simply forwarded by a constant amount and the existence of the image frame is verified, the wasteful conveyance and stopping of the film can be prevented and the operation efficiency can be improved.

In the sixth aspect of the present invention, the image frame position recognizing device recognizes the position of the image frame, on the basis of the perforations positioned at the aftermost portion of the photographic film in the conveying direction, the perforations are ones of the predetermined number of perforations which are provided with respect to one image frame.

In accordance with the sixth aspect, when the position of the image frame is recognized on the basis of the perforations, the perforation which is located at the aftermost portion of the photographic film in the conveying direction thereof is used. Thereby, conveying distance from the position of the image frame to be recognized to the predetermined position can be most shortened. The shorter the conveying distance, the better the accuracy. Accordingly, the image frame can be reliably positioned at the predetermined position.

The seventh aspect of the present invention is an apparatus for conveying a photographic film, in which the photographic film includes perforations formed therein at predetermined intervals and at which a predetermined number of perforations is provided with respect to one image frame, a cartridge is loaded such that the photographic film, in which respective images are photographed so that relative positions between the perforation and the image are constant, is wound in layers and is accommodated in a state in which an inner portion of the photographic film is engaged with a spool, an outer end portion of the photographic film in layers is withdrawn from the cartridge and is forwarded, and frames are forwarded so that the image frames are successively positioned at a predetermined position. The apparatus comprises: a conveying device which conveys the photographic film in a longitudinal direction; at least one of a perforation detection sensor which detects the perforations, an image frame determining device which, on the basis of the position of the perforation detected by the perforation detection sensor, determines whether the image frame exists at the position onto which the image is to be recorded, and a mark detection device which detects a designation mark which is applied in advance to the photographic film and which designates a position onto which the last image frame is to be recorded; a recognizing device which recognizes a position of the last image frame by combining one, two or more of the condition of the existence of the perforation and the count value of the perforation, the condition of the existence of the image frame and the count value of the perforation, and the condition of the existence of the designation mark; and a prohibiting device in which the conveyance of the photographic film by the conveying device from the cartridge in the withdrawing direction of the photographic film is prohibited, such that the last image frame which was recognized by the recognizing device does not go beyond the predetermined position.

In accordance with the aspects of the present invention, when one, two or more of a condition of the existence of the perforation and the count value, a condition of the existence of the image frame and the count value, and a condition of the existence of the specific mark are combined, the position of the last image frame is recognized. Further, the conveying of the photographic film by the conveying device in the direction in which the film is withdrawn from the cartridge can be prohibited by the prohibiting device so that the last image frame does not go beyond the predetermined position.

Accordingly, the photographic film is not withdrawn from the cartridge more than necessary and the engaging portion between the photographic film and the cartridge is not damaged.

BRIEF DESCRIPTION OF THE DRAWINGS

FIG. 7 is a plan view showing a state in which the negative film is conveyed on a negative carrier relating to the second embodiment.

DESCRIPTION OF THE PREFERRED EMBODIMENTS

Figure 2:
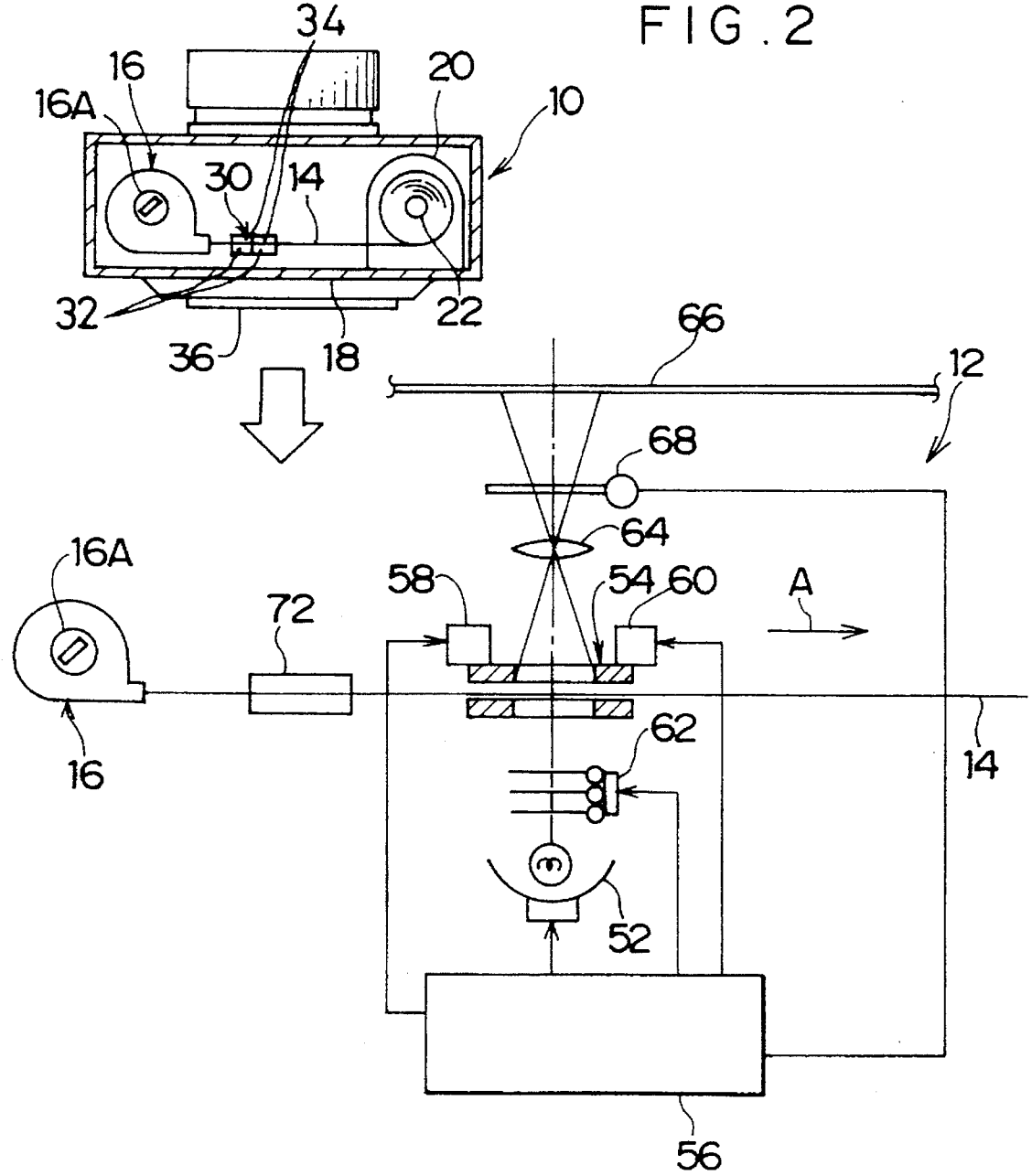
FIG. 2 is schematic structural view of a photographic printing device and a camera relating to the first embodiment.

FIG. 2 shows a camera 10 and a photographic printing device 12 relating to the present embodiment. A cartridge 16 is loaded in the camera 10 at one side thereof and accommodates a negative film 14, which is taken up onto a spool 16A. A driving reel 22, which is driven by a motor 20 connected to a control portion 18, is provided at the camera 10. The leading end of the negative film 14 is engaged with the driving reel 22 so that the frames of the negative film 14 can be advanced through the camera.

Figure 1:
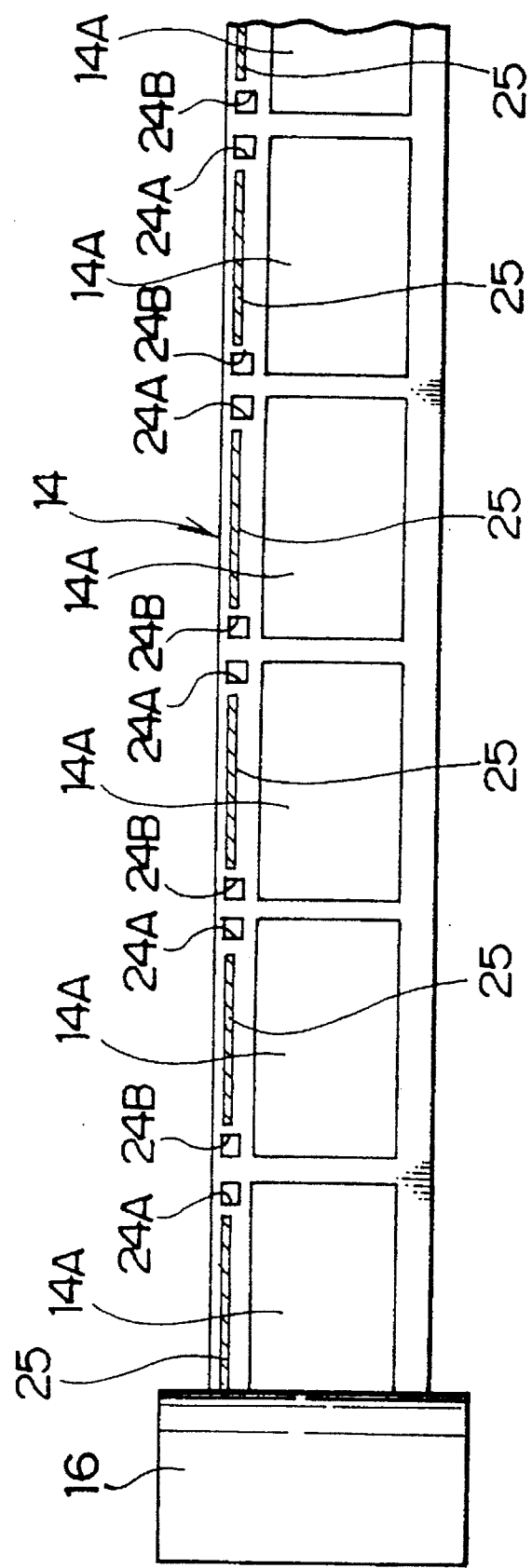
FIG. 1 is a plan view of a negative film relating to a first embodiment.

As shown in FIG. 1, two perforations 24A and 24B are respectively provided at one image frame 14A of the negative film 14. The perforations 24A and 24B are punched in advance in the negative film 14, and are used, for example, for positioning the film 14 when the film 14 is loaded in the above-described camera 10. Therefore, the image frame 14A is positioned by the perforations 24A and 24B so that relative positions of the image frame 14A and the corresponding two perforations 24A and 24B always conform to each other. Moreover, the two perforations 24A and 24B are disposed at the ends of the corresponding image frame 14A in the conveying direction of the negative film 14.

In addition, a magnetic recording layer 25 is provided on the transverse direction end portion of the negative film 14, at which the perforations 24A and 24B are provided. The magnetic recording layer 25 may be applied to, for example, the entire surface of the back surface of the negative film 14.

In this case, as illustrated in FIG. 1, the actual recording area is a short strip-like portion, which is partitioned by the respective image frames 14A.

Photographic information generated by the camera 10 (a shutter speed, an aperture size, photographed date and place and the like) is recorded onto the magnetic recording layer 25.

As shown in FIG. 2, near the conveying path of the negative film 14, two photoelectric sensors 30 are provided in the camera 10. The photoelectric sensors 30 correspond to the path at which the above-described perforations 24A and 24B are provided. A light-projecting portion 32 and a light-receiving portion 34 are provided in each of the photoelectric sensors 30 so as to be positioned at front and back surfaces of the negative film 14. In a case in which light from the above-described light-projecting portion is received by the light-receiving portion the respective one of the photoelectric sensors 30 outputs a high-level signal to the control portion 18.

The pitch between the two photoelectric sensors 30 (FIG. 2) is the same as the pitch between the two approaching perforations 24A and 24B (FIG. 3), which are provided at formed in the above-described negative film 14. Here, when the negative film 14 passes between the light-projecting portion 32 and the light-receiving portion 34 and the two approaching perforations 24A and 24B are simultaneously detected by the photoelectric sensors 30, the photographic area which is determined in advance is positioned at the predetermined position. The photographic area becomes an image frame 14A after the film 14 is photographed and developed.

Here, if the negative film 14 is successively photographed in a state in which the negative film 14 is loaded in the camera 10, image frames of every predetermined pitch exist after the negative film 14 is developed. In a case in which, for example, a shutter is operated while a lens cap is closed, one frame is conveyed while the image is not photographed at all. As a result, the frame is advanced without exposure (see the image frame shown by an imaginary line in FIG. 3).

After the photographed negative film 14 is rewound in the cartridge 16, the film 14 is withdrawn from the camera 10, and is taken to a processing laboratory via a DPE shop ("DPE shop" refers to a place where a film is dropped off by the user. At the laboratory, the negative film 14 is developed and placed at a predetermined position in the photographic printing device 12.

As illustrated in FIG. 2, in the photographic printing device 12, a negative carrier 54 is disposed on the optical axis of the light source 52 so as to be illuminated at the time of printing. A drive roller 58A (see FIG. 3), which is rotated by the driving force of a driving portion 58 connected to the controller 56, is provided at the negative carrier 54. The negative film 14 is conveyed in the direction of arrow A in FIG. 2. Further, a solenoid 60 is provided at the negative film 14, and thus the negative film 14 can be held, pressed and contacted at an edge portion a mask opening 55A (see FIG. 3), which is a printing position, in response to a signal from the controller 56.

Filters 62 of cyan (C), magenta (M) and yellow (Y) are interposed between the light source 52 and the negative carrier 54 so that the respective filters 62 appear in the optical path in accordance with the amount of exposure of the respective colors.

The light which has transmitted through the negative film 14 is illuminated onto a photographic printing paper 66 via a lens 64, and images are printed on the photographic printing paper 66. A shutter 68 is interposed between the photographic printing paper 66 and the lens 64 and is withdrawn from the optical axis at the time of exposure by the signal from the controller 56.

A photoelectric sensor 72, which serves as a perforation detection sensor, is provided near the conveying path of the negative film 14 and on the locus of transmission of the perforations 24A and 24B. As a result, the perforations 24A and 24B can be detected by the detection signal of the photoelectric sensor 72.

The negative film 14 of the present embodiment is conveyed and positioned on the basis of the perforations 24A and 24B and then photographed by the camera 10. Accordingly, the relative positions between the perforations 24A, 24B and the image frame 14A are always the same. Therefore, the position of the image frame 14A can be recognized by detecting the perforations 24A and 24B.

Figure 3:
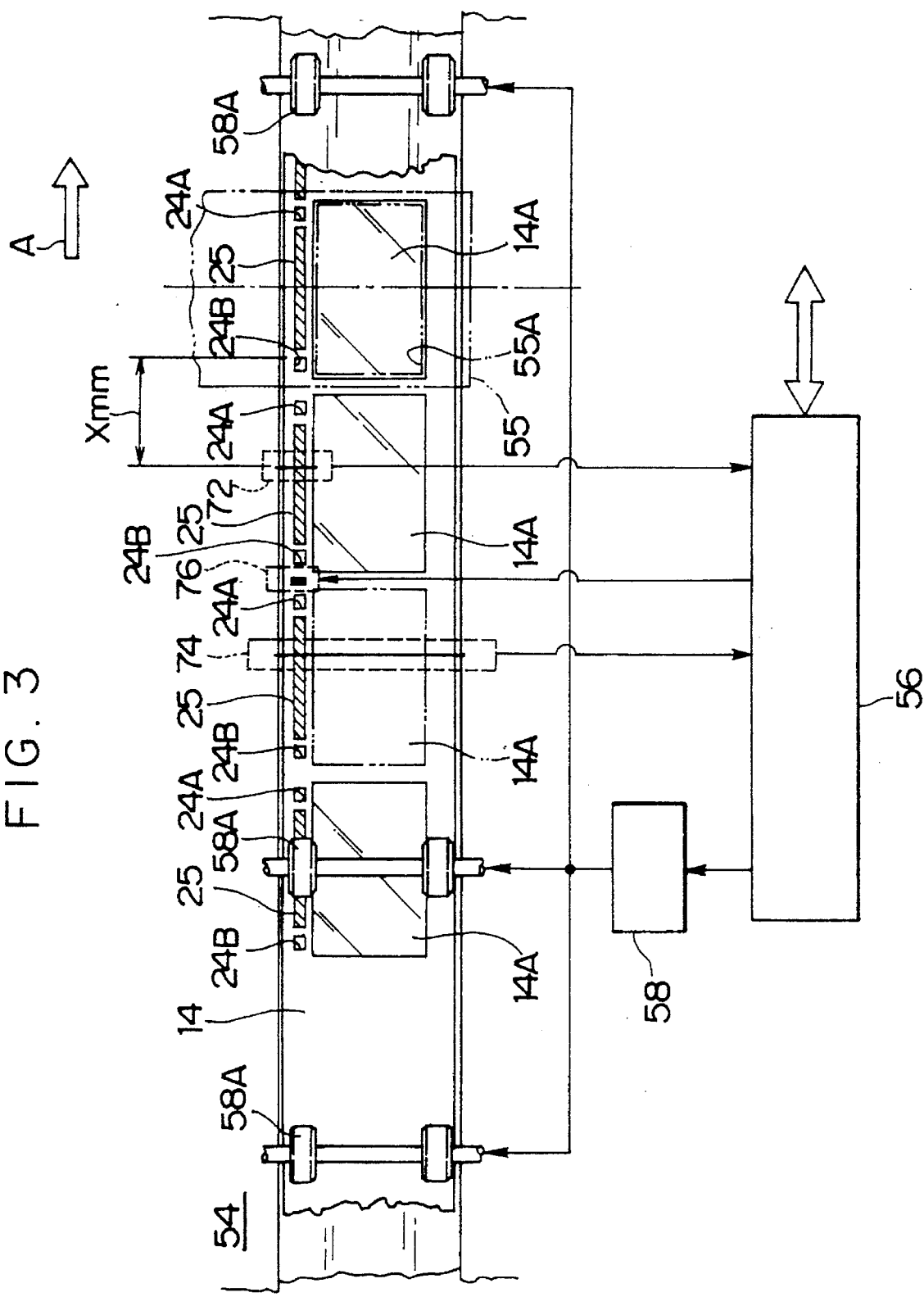
FIG. 3 is a plan view showing a state in which the negative film is conveyed on a negative carrier relating to the first embodiment.

In the present embodiment, as illustrated in FIG. 3, the detection point of the above-described photoelectric sensor 72 is provided a position which is at a predetermined distance (X mm) to the upstream side of the position of the perforation 24B, which corresponds to the image frame 14A which is positioned at a printing position (the mask opening 55A of the mask 55).

After the perforation 24B is detected by the photoelectric sensor 72, the negative film 14 is stopped at a position after the negative film 14 is conveyed by X mm. The image frame 14A which corresponds to the perforation 24B is positioned at the printing position.

Moreover, in the present embodiment, a line-shaped CCD sensor 74 is disposed at the upstream side of the above-described photoelectric sensor 72 (at a position corresponding to the image frame 14A located two frames in advance of the printing position). The CCD sensor 74 can detect the density of the negative film 14. In the negative film 14, the density of the portion on which the image is printed and the density of the base portion are clearly different.

For example, it can be determined that the portion at which transmittance density is high is an image area and the portion at which transmittance density is low is a base portion. In the present embodiment, the density is detected by the CCD sensor 74 two frames in advance of the printing position so that it can be determined as to whether the image frame 14A is continuously provided. Namely, as mentioned above, there is a case in which the frames are advanced without exposure when the film is photographed by the camera 10 such that one frame is skipped and the subsequent frame is photographed. In this way, a determination is made by the CCD sensor 74 as to whether the image frame 14A exists. If it is determined that the image frame 14A does not exist, the positioning of this particular portion at the printing position is canceled and the film continues to advance.

Further, in the present embodiment, a recording head 76 is provided between the above-described CCD sensor 74 and the printing position and at a borderline portion between the two image frames 14A. The recording head 76 can record the information at a predetermined position of the above-described magnetic recording layer 25 while the negative film 14 is conveyed. As a result, when the negative film 14 is stopped (when one image frame 14A is positioned at the printing position), the recording position is located at a position apart from the magnetic recording layer 25 (the actual recording area).

Here, the recording head 76 records the information in which the image frame does not exist on the magnetic recording layer 25. The recording layer 25 corresponds to the image frame recording area which is determined by the above-described CCD sensor 74 to not have an image does.

When the image frame is positioned for subsequent processes, the information on the magnetic recording layer 25 is read from this record. Accordingly, it can be recognized that the image frame does not exist in the image frame recording area so that the positioning control for that image frame can be canceled.

The operation of the present embodiment will be explained hereinafter.

Figure 4A:
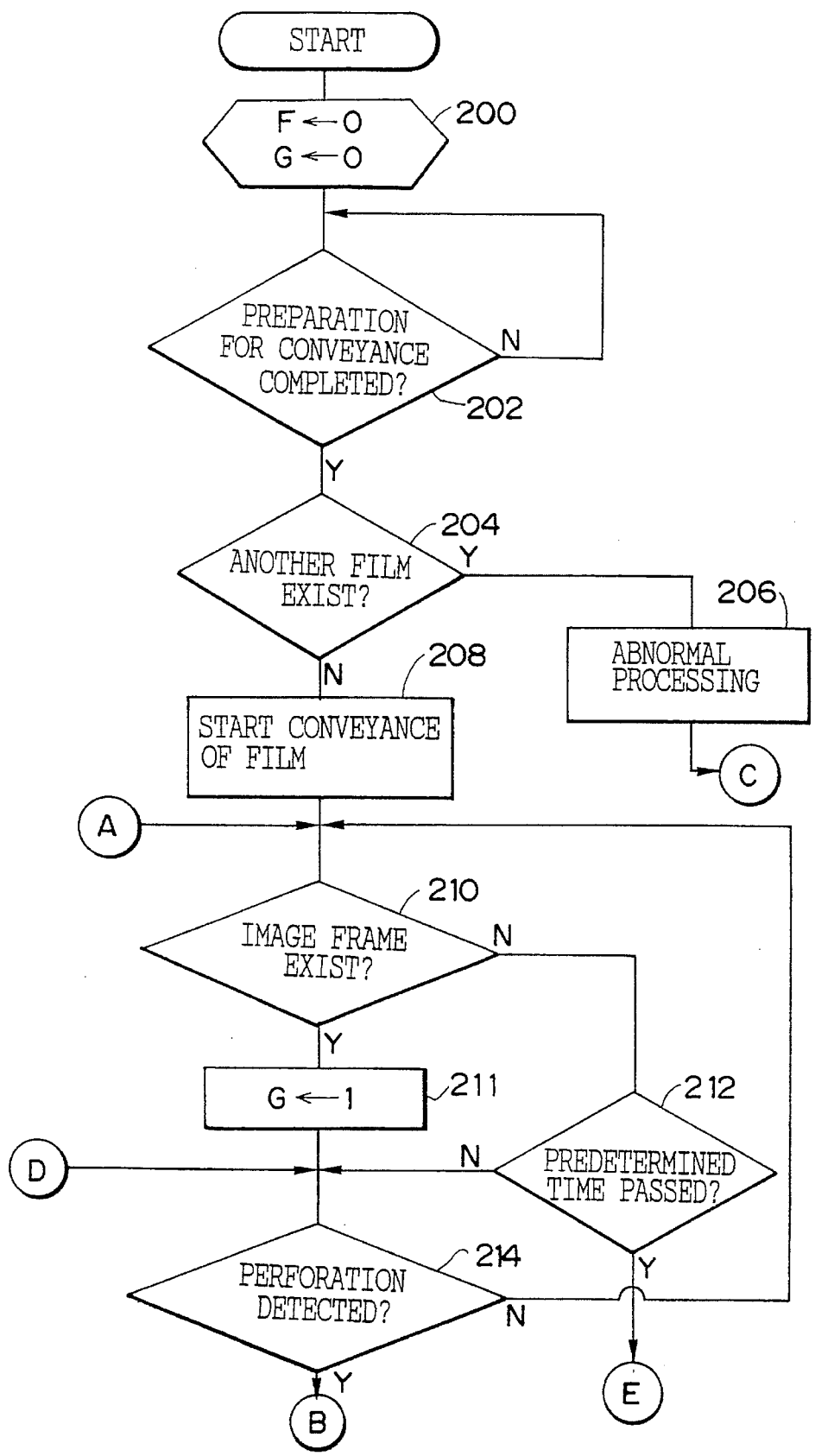
FIGS. 4A and 4B are flow charts showing a control routine for conveying the negative film.
Figure 4B:
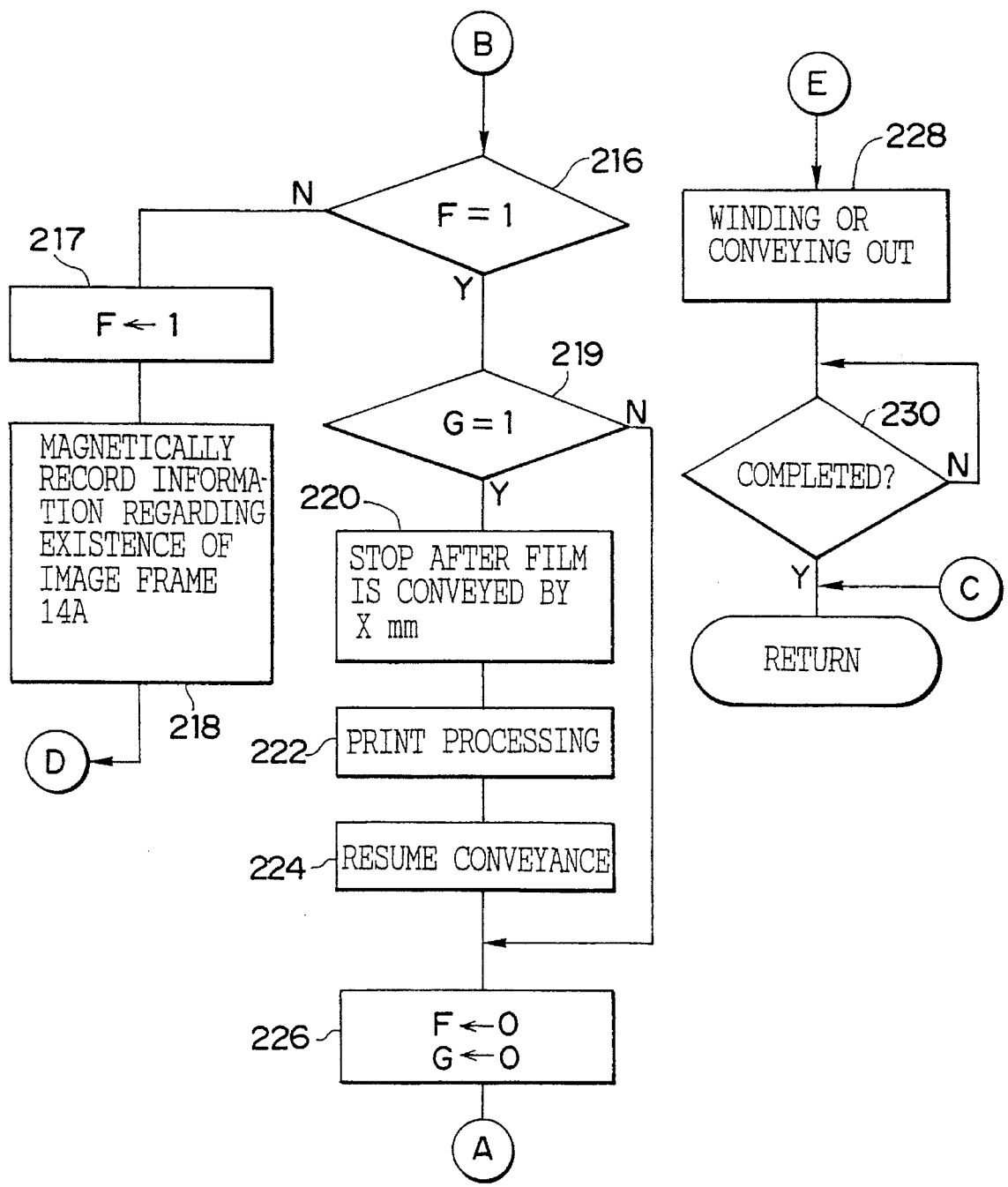

After the negative film 14 is photographed, a customer withdraws the negative film 14 after it is rewound into the (after it is rewound into the cartridge 16) from the camera 10 and requests development of and prints from the negative film 14 at a DPE shop. The negative film 14 is sent from the DPE shop to a processing laboratory. At the laboratory, the negative film 14 is first developed and then placed at a predetermined position of the photographic printing device 12. The positioning of the respective image frames 14A at the printing position and a course of print processing are described hereinafter in accordance with a flowchart shown in FIGS. 4A and 4B.

First, in step 200, a flag F and a flag G are respectively reset to 0. Next, in step 202, a determination is made as to whether a preparation for conveyance has completed. For example, a determination is made as to whether the cartridge 16 has been loaded in the camera 10 and the withdrawal of the leading end of the negative film 14 has completed.

In a subsequent step 204, a determination is made as to whether another negative film 14 already exists in the negative carrier 54. If the answer to the determination in step 204 is "Yes", because the negative film 14 cannot be conveyed, the process moves to step 206 where abnormal processing is effected. In the abnormal processing, for example, an alarm is issued so as to indicate abnormality, and the operator is urged to withdraw the existing negative film 14 from the negative carrier 54. The abnormality occurs in a case in which a previously-processed negative film is withdrawn from the cartridge 16 and is print processed by the photographic printing device 12, however, the above negative film is not removed from the film accommodating portion (unillustrated) of the photographic printing device 12.

Further, if the answer to the determination in step 204 is "No", the process moves to step 208 where the conveyance of the negative film 14 is started. Namely, the driving portion 58 is driven by the control of the controller 56, and the negative film 14 is conveyed in the direction of arrow A in FIG. 3 by the rotation of the driving roller 58A.

In a subsequent step 210, a determination is made as to whether the image frame 14A has been detected by the CCD sensor 74 (whether the image frame 14A exists or not). If the answer to the determination in step 210 is "Yes", the process moves to step 211 where a flag G is set to 1 so as to indicate that the image frame 14A exists at a predetermined image frame recording area, and thereafter, the process moves to step 214. If the answer to the determination in step 210 is, "No", the process moves to step 212. In step 212, a determination is made as to whether a predetermined time has passed. If the answer to the determination in step 212 is "No", the process moves to step 214. In step 214, a determination is made as to whether the perforation 24A or 24B has been detected by the photoelectric sensor 72. If the answer to the determination in step 214 is "No", the process returns to step 210. Accordingly, until the perforation 24A or 24B is detected or until the predetermined time has passed, steps 210, 212 and 214 are repeated. When the image frame 14A is detected while the steps 210, 212 and 214 are repeated, the flag G is set to 1.

If the answer to the determination in step 214 is "Yes" before the predetermined time has passed in step 212, the perforation 24A is detected. If the perforation 24A is detected, the process moves to step 216 where a determination is made as to whether the flag F is set to 1. When the perforation 24A is detected, the flag F is in a state of reset because it is the first time that the perforation is detected. As a result, the answer to the determination in step 216 is "No". The process then moves to step 217 where the flag F is set to 1. Next, in step 218, the information regarding the existence of the image frame 14A is recorded onto the magnetic recording layer 25. Thereafter, the process returns to step 214.

Next, the perforation 24B is detected. The perforation 24B is detected in step 214, and the process moves to step 216. Because the flag F is set to 1 at this time, the answer to the determination in step 216 is "Yes" and the process moves to step 219.

In order to determine as to whether the image frame 14A exists in the image frame recording area which corresponds to the above-described perforations 24A and 24B, which have been detected while the negative film 14 is conveyed, in step 219, a determination is made as to whether the flag G is set to 1. Namely, if the image frame 14A is detected in steps 210 and 211, the flag G is set to 1. Therefore, the answer to the determination in step 219 is "Yes". The process then moves to step 220.

In step 220, the negative film is conveyed by X mm, and thereafter, the rotation of the driving roller 58A is stopped. As a result, the image frame 14A is positioned at a printing position (a mask opening 54A) and then the process moves to step 222 where the print processing described hereinafter is effected.

When the predetermined image frame 14A reaches the printing position, the solenoid 60 is driven so as to hold, press and contact the negative film 14 at the printing position.

In this state, the shutter 68 is opened and the respective filters 62 of C, M, Y are inserted in optical path in accordance with the amount of exposure. The light transmitted through the negative film 14 is illuminated onto the photographic printing paper 66 via the lens 64, and images are printed on the photographic printing paper 66.

In a subsequent step 224, the conveyance of the negative film 14 by the driving roller 58A is resumed, and then the process moves to step 226. Even if the answer to the determination in step 219 is "No", the process moves to step 226. Namely, because the image frame 14A does not exist in the image frame recording area which corresponds to the detected perforations 24A and 24B, all of the positioning control, print processing and the like are canceled and the conveyance of the negative film 14 is continued even after the predetermined pitch (the pitch of the image frame) has passed.

In step 226, the flags F and G are reset to 0 and the process returns to step 210.

Next, if the image frame 14A is not detected by the CCD sensor 74 even after the predetermined time has passed, i.e., if the answer to the determination in step 212 is "Yes" while steps 210, 212, 214 are repeated, it is determined that the print processing of the last image frame 14A has been completed. The process moves to step 228 where the negative film 14 is wound in the cartridge 16 by rotating the driving roller 58A in the opposite direction. In the present embodiment, the cartridge 16 is loaded as it is, and the negative film 14 is print processed without being removed from the cartridge 16. However, in a case in which the negative film 14 is removed from the cartridge 16 and print processed, the negative film 14 is continuously conveyed in the direction of arrow A in FIG. 3 as it is by rotating the driving roller 58A in the forward direction (the conveying direction of the film) so that the negative film 14 is conveyed out of the film accommodating portion (unillustrated).

In a subsequent step 230, a determination is made as to whether the above-described winding or cancellation has been completed. If the answer to the determination in step 230 is "Yes", the routine ends.

In this way, in a case in which the image frame 14A is positioned at the printing position on the basis of the perforation 24B, when the image frame 14A does not exist in the image frame recording area which corresponds to the detected perforation 24B, the conveyance is continued. Accordingly, the time wasted for positioning a frame without an image can be eliminated. Further, since the print processing is effected after the positioning, the waste of photographic printing paper which is resulted from erroneous printing of the frames having no images can be avoided.

Moreover, if the information regarding the existence of the image frame 14A is recorded, it is not necessary to detect the existence of the image frame 14A again when the customer requests the printing of the film 14 again. The operation efficiency is thereby improved.

In the present embodiment, an example is described of a case in which the photographic printing device 12 is used as an apparatus for conveying a photographic film. However, the present embodiment can be applied to other apparatus for conveying a photographic film such as detector or the like. Further, the conveying device for detecting only the existence of the image frame 14A may be separately provided so that the information (the information regarding the existence of the image frame 14A) is magnetically recorded onto the magnetic recording layer 25, and the information on the magnetic recording layer:25 is read by devices at the respective processes.

Figure 5:
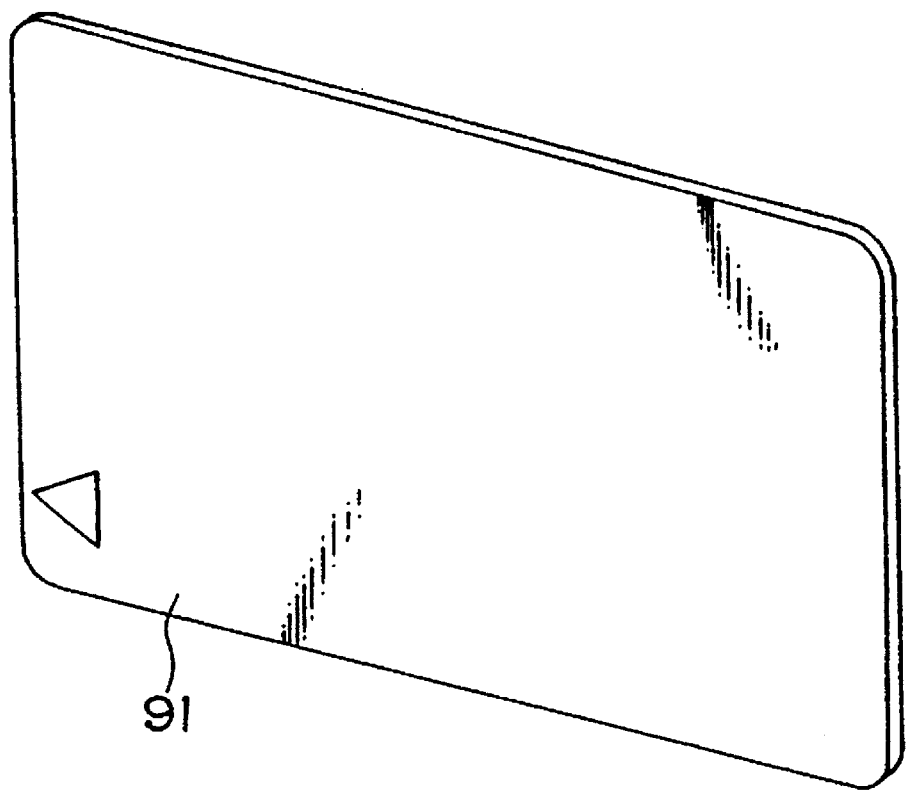
FIG. 5 is a perspective view of a memory card.

Besides the magnetic recording layer 25, as illustrated in FIG. 5, the information regarding the existence of the above-described image frame 14A may be recorded onto a memory card 91, such as an LSI card or the like, which is conveyed together with the negative film 14 when the respective processes are effected at the laboratory.

Moreover, in the present embodiment, the existence of the image frame 14A is detected on the basis of the density information detected by the CCD sensor 74. However, when the negative film 14 is photographed by the camera 10, the information in which the image frame 14A does not exist may be magnetically recorded or optically recorded in advance automatically or manually. The recorded information and the density detected by the CCD sensor 74 may be combined in advance.

A description will be given of a second embodiment. A camera, a photographic printing device and a negative film used in the second embodiment are similar to those of the first embodiment. Only structures, members, parts and the like which are different from those of the first embodiment will be described.

Figure 6:
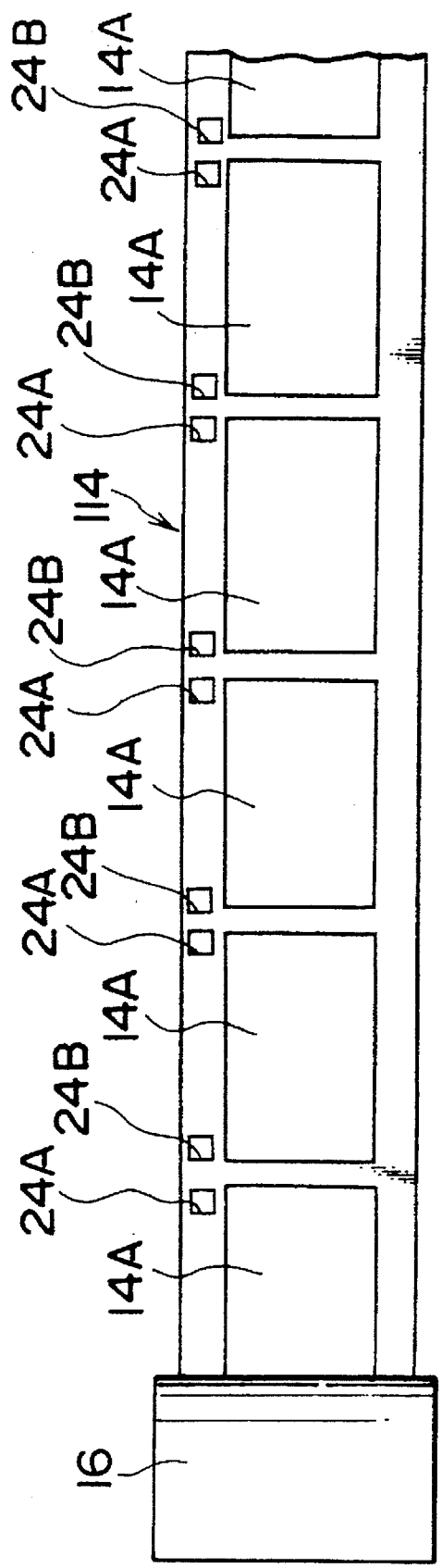
FIG. 6 is a plan view of a negative film relating to a second embodiment.

As shown in FIG. 6, a negative film 114 of the second embodiment is different from the negative film 14 of the first embodiment in that a magnetic recording layer is not provided. Besides that of the negative film 114 is the same as the negative film 14 of the first embodiment. In addition, unlike the photographic printing device of the second embodiment, a recording head is not provided at a photographic printing device of the second embodiment. Namely, as illustrated in FIG. 7, a controller 156 is connected to the driving portion 58 so as to rotate the driving roller 58A via the driving portion 58. Moreover, the photoelectric sensor 72 is connected to the controller 156 so that, when the photoelectric sensor 72 detects the perforations 24A and 24B, the photoelectric sensor 72 sends the detection signals to the controller 156. The CCD sensor 74 is connected to the controller 156 so that, when the CCD sensor 74 detects the density of the negative film 114, the CCD sensor 74 sends the detection signal to the controller 156. Further the driving roller 58A is controlled by the controller 156 so that after the photoelectric sensor 72 detects the perforation 24B, the negative film 114 is conveyed by X mm and the conveyance of the negative film 114 is stopped. Other structures of the second embodiment are similar to those of the first embodiment, and descriptions thereof are omitted.

The operation of the second embodiment will be explained hereinafter. The operation of the second embodiment will be described using FIG. 2 of the first embodiment, where appropriate.

Figure 8A:
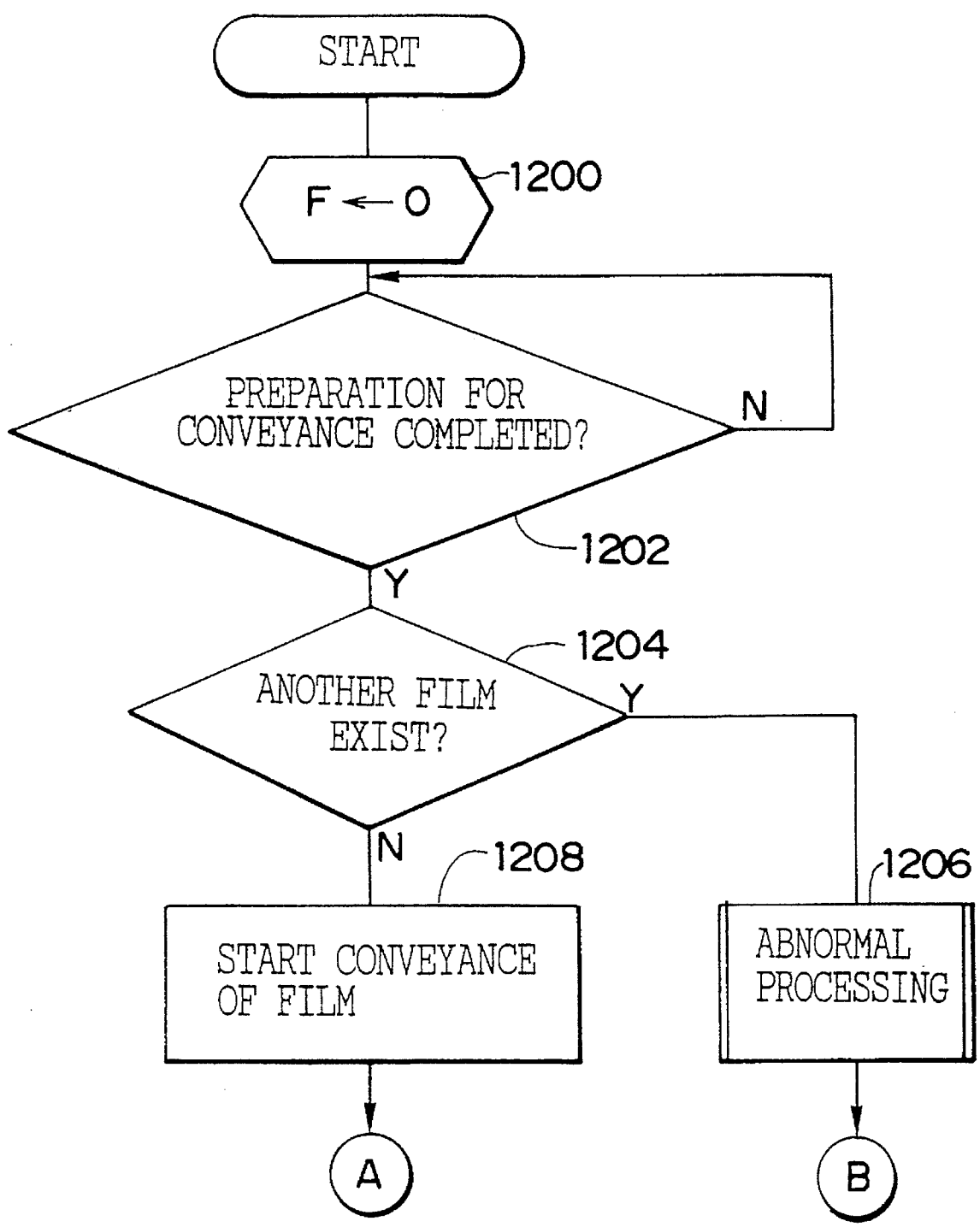
FIGS. 8A and 8B are flow charts showing a control routine for conveying the negative film of the second embodiment.
Figure 8B:
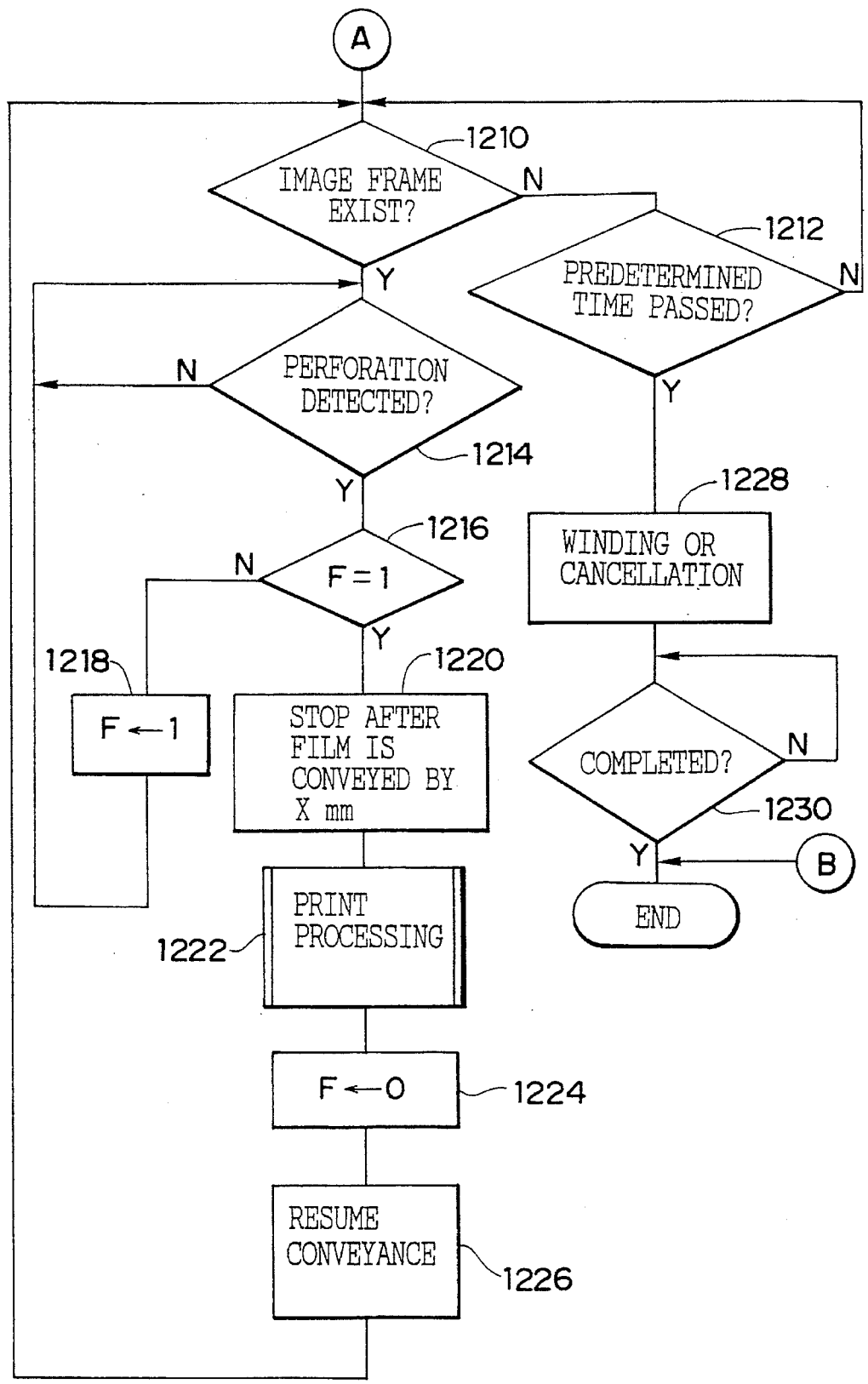

After the negative film 114 is photographed, a customer withdraws the negative film 114 (the cartridge 16) from the camera 10 and requests development of and prints from the negative film 114 at a DPE shop. The negative film 114 is sent from the DPE shop to a processing laboratory. At the laboratory, the negative film 114 is first developed and then placed at a predetermined position of the photographic printing device 112. The positioning of the respective image frames 14A at the printing position and a course of print processing are described hereinafter in accordance with a flowchart shown in FIGS. 8A and 8B.

First, in step 1200, a flag F is reset to 0. Next, in step 1202, a determination is made as to whether a preparation for conveyance has completed. For example, a determination is made as to whether the cartridge 16 has been loaded in the camera 10 and the withdrawal of the leading end of the negative film 114 has completed.

In a subsequent step 1204, the processing which is the same as the processing of the first embodiment is effected, and accordingly, description thereof is omitted.

Moreover, since a subsequent step 1208 is also the same as the step 208 of the first embodiment, description thereof is omitted.

In a subsequent step 1210, a determination is made as to whether the image frame 14A has been detected by the CCD sensor 74 (whether the image frame 14A exists or not). If the answer to the determination in step 1210 is "No", the process moves to step 1212. In step 1212, a determination is made as to whether predetermined time has passed. If the answer to the determination in step 1212 is "No", the process returns to step 1210. Accordingly, until the image frame 14A is detected or until the predetermined time has passed, steps 1210 and 1212 are repeated.

Here, if the image frame 14A is detected in step 1210, the process moves to step 1214 where the detection of the perforations 24A and 24B is effected.

In step 1214, the perforation 24A is detected. If the perforation 24A is detected, the process moves to step 1216 where a determination is made as to whether the flag F is set to 1. When the perforation 24A is detected, the flag F is in a state of reset because it is the first time that the perforation is detected. As a result, the answer to the determination in step 1216 is "No". The process then moves to step 1218 where the flag F is set to 1. Thereafter, the process returns to step 1214.

Next, the perforation 24B is detected. In step 1214, the perforation 24B is detected, and the process moves to step 1216. Because the flag F is set to 1 at this time, the answer to the determination in step 1216 is "Yes" and the process moves to step 1220.

Because steps 1220 and 1222 are the same as the steps 220 and 222 of the first embodiment, descriptions thereof are omitted.

In a subsequent step 1224, the flag F is reset to 0. Subsequently, in step 1226, the conveyance of the negative film 114 is resumed, and the process returns to step 1210.

Next, if the image frame 14A is not detected even after the predetermined time has passed, i.e., if the answer to the determination in step 1212 is "Yes" while steps 1210 and 1212 are repeated, it is determined that the print processing of the last image frame 14A has been completed. The process moves to step 1228 where the negative film 114 is wound in the cartridge 16.

In a subsequent step 1230, a determination is made as to whether the above-described winding or cancellation has been completed. If the answer to the determination in step 1230 is "Yes", the routine ends.

In this way, because the image frame 14A is positioned at the printing position on the basis of the perforation 24B, it is not necessary to effect a conventional complicated control such as detecting the edge of the image frame 14A. The control of the positioning can be effected easily and accurately.

Figure 9:
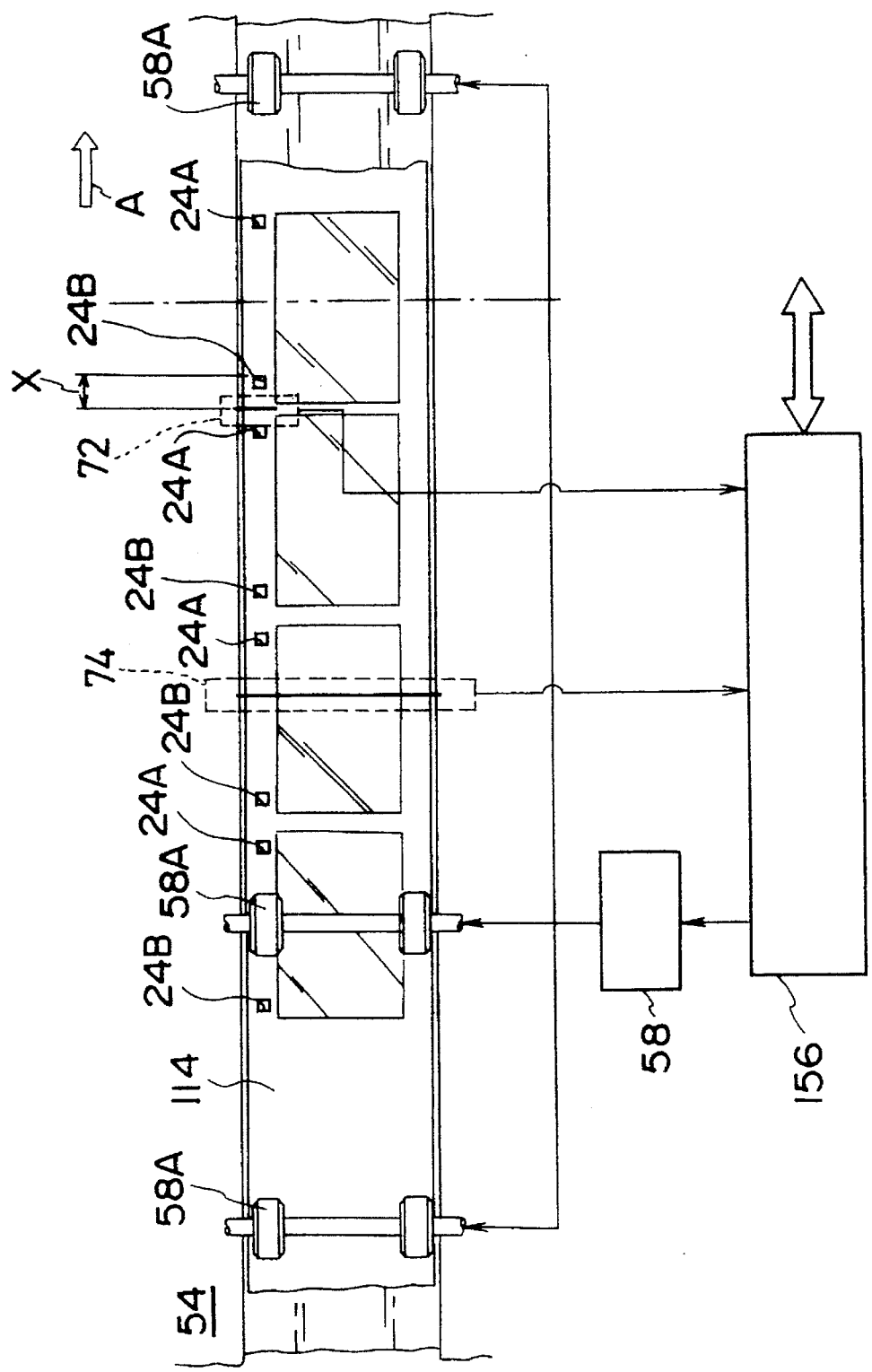
FIG. 9 is a plan view showing a variant example of a mounting position of a perforation detection sensor.

In the present embodiment, an example is described of a case in which the photographic printing device is used as an apparatus for conveying the photographic film. However, the present embodiment can be applied to other apparatus for conveying a photographic film such as a detector or the like. As illustrated in FIG. 9, in a case in which the mask opening 55A does not exist as in the present embodiment, the photoelectric sensor 72 is moved closer to the position at which the image frame 14A is positioned. As a result, the conveying distance (X mm) after the perforation 24B is detected can be shortened. The accuracy of positioning can be further improved.

Figure 10:
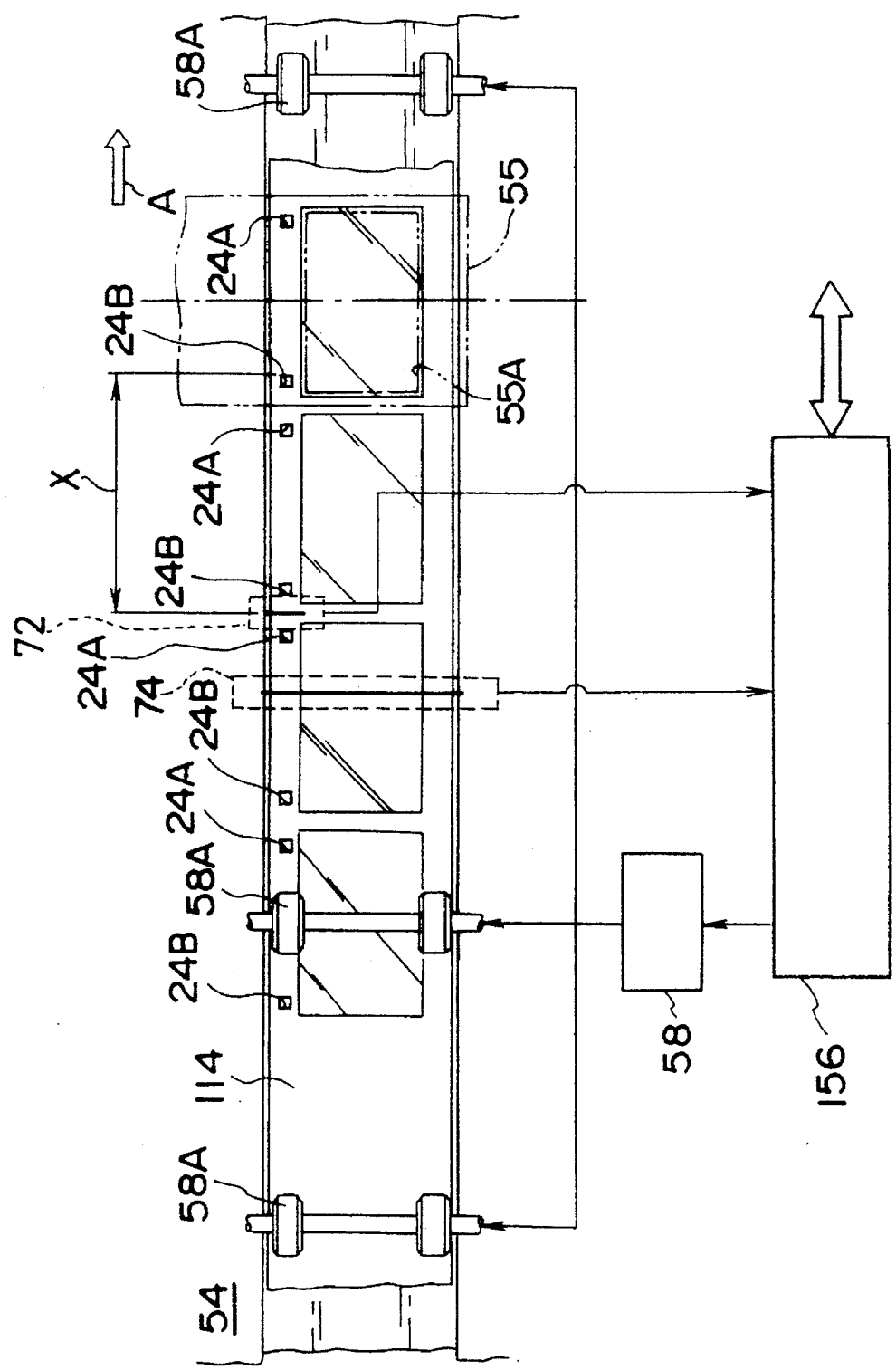
FIG. 10 is plan view showing a variant example of a mounting position of a perforation detection sensor.

Further, the position to which the photoelectric sensor 72 is mounted is not limited to the same. As illustrated in FIG. 10, provided that the photoelectric sensor 72 is disposed at the upstream side of the image frame 14A, the distance between the center position at which the image frame 14A is positioned and the position to which the photoelectric sensor 72 is mounted may be longer than the length of one frame. Due to the limitation of the device, in a case in which the distance between the center position at which the image frame 14A is positioned and the position to which the photoelectric sensor 72 is mounted is longer than the length of one frame, as shown in FIG. 10, the next perforation 24B is detected before the positioning of the image frame 14A ends. Therefore, the value at which the conveying distance (D mm) after the next perforation 24B is detected is subtracted from the above-described conveying distance (X mm), i.e., (X–D) is stored, and the film is conveyed on the basis of the stored value at the next positioning.

Figure 11:
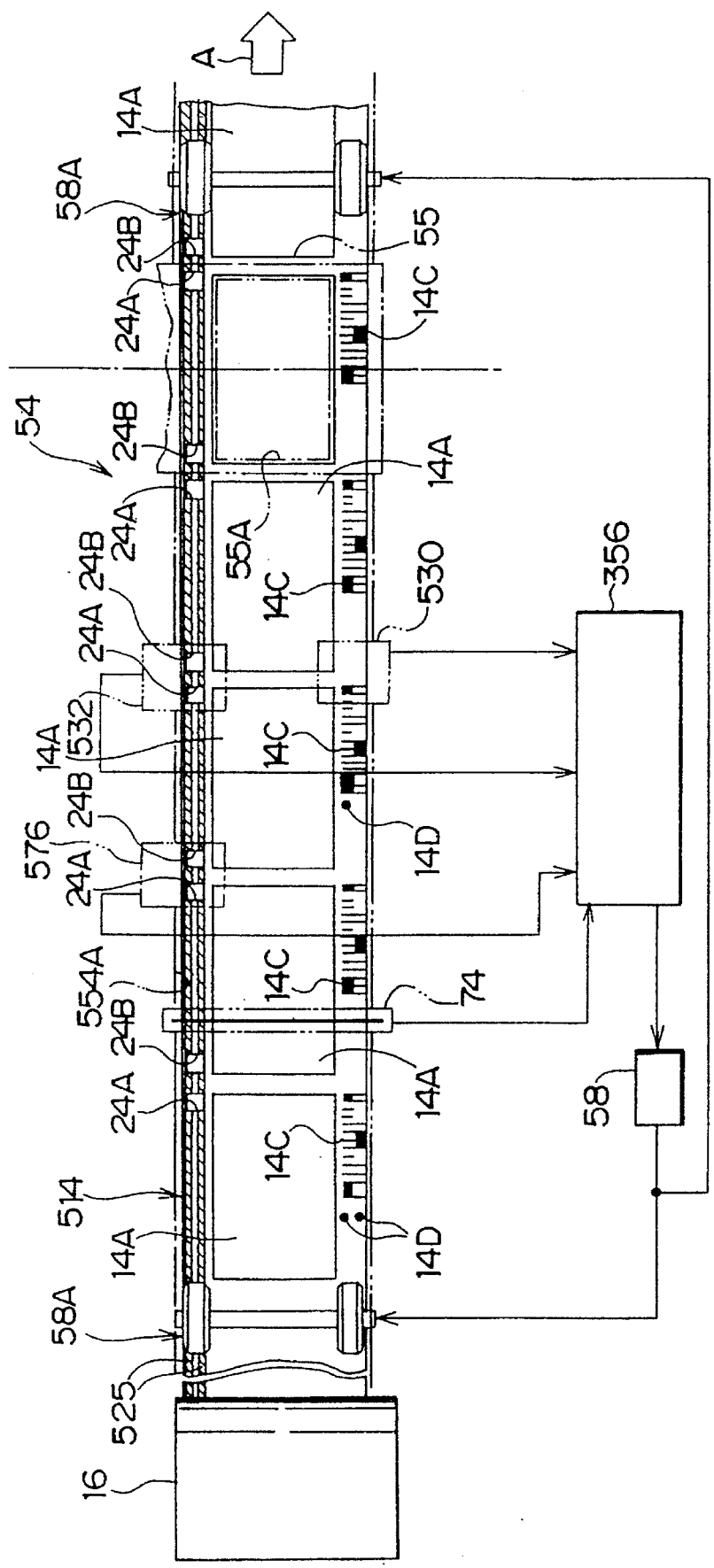
FIG. 11 is a plan view showing a state in which a negative film is conveyed on a negative carrier relating to a third embodiment.
Figure 12:
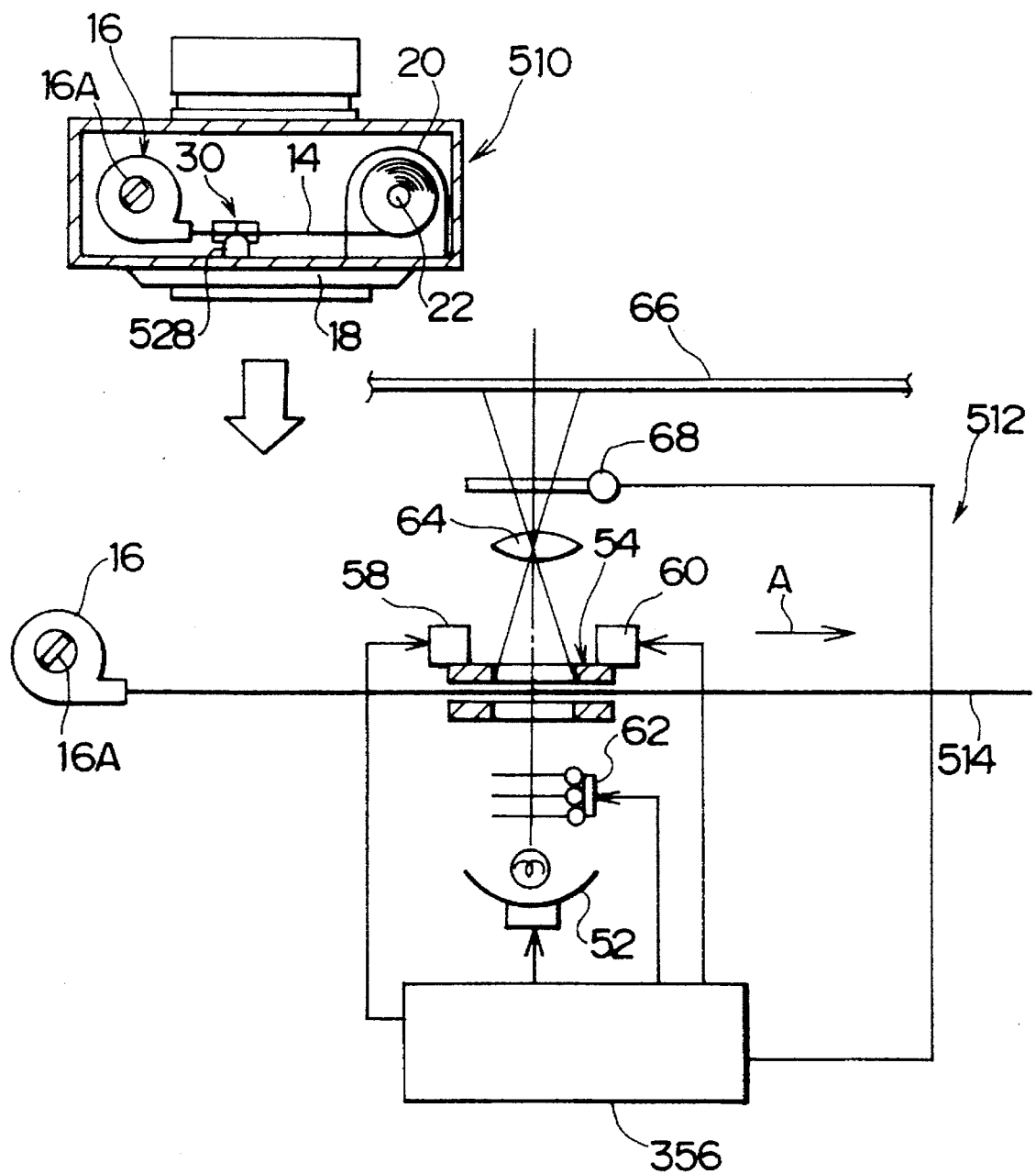
FIG. 12 is a schematic structural view of a photographic printing device and a camera relating to a third embodiment.

FIGS. 11 and 12 show a camera 510 and a photographic printing device 512 relating to the third embodiment. Both the camera 510 and the photographic printing device 512 of the third embodiment are similar to the camera 10 and the photographic printing device 12 of the first embodiment. In describing the third embodiment, members, structures, parts and the like which are the same are denoted by the reference numerals used in the first embodiment, and descriptions thereof are omitted.

Further, a magnetic recording layer 525 is provided at the transverse direction end portion of the negative film 514, at which the perforations 24A and 24B are provided. The magnetic recording layer 525 is applied to the entire surface of the back surface of the negative film 514. As shown in FIG. 11, the actual recording area is formed by two short strip-like portions.

Photographic information by the camera 510 (a shutter speed, an aperture, photographed date and place and the like) is recorded onto the magnetic recording layer 525.

Moreover, two types of optical information are respectively recorded onto the transverse direction end portion of the negative film 514, at which the perforations 24A and 24B are provided, and the end portion thereof at the opposite side. The first optical information is a bar code 14C which denotes an ID number, a frame number or the like, which are printed in advance on the negative film 514 when the negative film 514 is manufactured. The second optical information is a size designating mark 14D which is printed, for example, for designating a print size (an AL size, an AH size, and an AP size) of the photographic printing paper when the film is photographed by the camera. The AL size is the size at which the film is usually finished by simultaneous printing with the aspect ratio of 5 to 3.5; the AH size is the format of high definition television with the aspect ratio of 16 to 9; and the AP size is the size at which the two AL sizes with the aspect ratio of 10 to 3.5 are arranged side by side. The size designating mark 14D is determined, for example, by the number of black-dotted marks, and can be recognized by looking at it.

Regardless of the size designating mark 14D, the size of the image frame 14A is constant. By changing the print magnification, the image frame 14A can correspond to the different size. Accordingly, the size of the same image frame 14A can be changed.

Further, a magnetic head 528 is provided at the camera 510 so as to correspond to the above-described magnetic recording layer 525. The photographed date and place, the shutter speed, the aperture and the like can be magnetically recorded onto the magnetic head 528.

After the photographed negative film 514 is rewound in the cartridge 16, the film 514 is withdrawn from the camera 510, and is taken to a processing laboratory via a DPE shop. At the laboratory, the negative film 514 is developed and placed at a predetermined position of the photographic printing device 512.

As illustrated in FIG. 11, a perforation sensor 532 is provided on the conveying path 54A of the negative film 514 and on the locus of transmission of the perforations 24A and 24B. As a result, the perforations 24A and 24B can be detected by the detection signal of the perforation sensor 532.

The negative film 514 of the present embodiment is conveyed and positioned on the basis of the perforations 24A and 24B and then photographed by the camera 510. Accordingly, the relative positions between the perforations 24A, 24B and the image frame 14A are always the same. Therefore, the position of the image frame 14A can be recognized by detecting the perforations 24A and 24B.

Namely, as illustrated in FIG. 11, a detection point of the above-described perforation sensor 532 is provided at a position which is at a predetermined distance to the upstream side of the positions of the perforations 24A and 24B (in the present embodiment, between the first frame and the second frame before the image frame provided at the printing position), which correspond to the image frame 14A which is positioned at a printing position (the mask opening 55A of the mask 55).

After the perforations 24A and 24B are detected by the perforation sensor 532, the negative film 514 is stopped at a position at which the negative film 514 is conveyed the predetermined distance. The image frame 14A which corresponds to the perforations 24A and 24B is positioned at the printing position.

Further, the area onto which the last image frame is recorded can be determined by the count values of the perforations 24A and 24B detected by the perforation sensor 532. Namely, for example, in a case in which the number of films which can be photographed (the number of sheets to be photographed) is constant, i.e., in a case in which the number of films which can be photographed is recognized as the number is set, it is easier to specify the perforations 24A and 24B which correspond to the last image frame by counting the perforations 24A and 24B.

Moreover, the line-shaped CCD sensor 74 is disposed at the upstream side of the above-described perforation sensor 532 (in the present embodiment, three frames before the image frame 14A provide at a position the printing position).

In the present embodiment, the CCD sensor 74 can detect the density of the negative film 14 at three frames before the printing position, and it can be determined as to whether the image actually exists at an area onto which the image is recorded. Accordingly, under the condition that the image frames 14A are successively provided, if it is determined that the image does not exist at an area onto which the image is recorded, it can be recognized that the last determined image is recorded onto the last image frame area.

Further, a magnetic head unit 576 is provided between the above-described CCD sensor 74 and the printing position, and at a borderline portion between the two image frames (in the present embodiment, between the second frame and the third frame before the image frame provided at the printing position). A head, which records information onto the predetermined position of the above-described magnetic recording layer 525 and reads information from the magnetic recording layer 525 while the negative film 514 is conveyed, is attached to the magnetic head unit 576. When the negative film 514 is stopped (when one image frame 14A is positioned at the printing position), the magnetic head unit 576 is disposed so that the recording position is apart from the position of the magnetic recording layer 525 (the actual recording area). Every time the frame is forwarded, the magnetic head unit 576 can pass over one frame portion of the magnetic recording layer 525.

When the film is photographed by the camera 510 or the negative film 514 is manufactured, if the mark, which denotes the area onto which the last image frame is to be recorded, is recorded in advance onto the magnetic recording layer 525, the position of the last image frame can be recognized by reading the mark.

On the other hand, a bar code sensor 530 is disposed at an end portion of the negative film 514 at the transverse direction opposite side of the side at which the magnetic recording layer 525 is provided. A light-projecting portion and a light-receiving portion is disposed at the bar code sensor 530 with the negative film 514 therebetween, and the light which is illuminated by the light-projecting portion and transmitted through the negative film 514 is received by the light-receiving portion. As a result, as the bar code sensor 530 reads the information while the negative film 514 is conveyed, the existence and width of the bar as the bar code 14C can be recognized. The bar code sensor 530 can also detect the above-described size designating mark 14D.

The position at which the bar code sensor 530 is mounted is determined on the basis of the position at which the above-described perforation sensor 532 is mounted. When the perforations 24A and 24B are simultaneously detected, the bar code sensor 532 is disposed so that the position at which the bar code sensor 530 starts to read is located at the head of the bar code.

When the negative film 514 is manufactured, the above-described bar code 14C is provided in advance at every area onto which the image is recorded. In a case in which the bar code 14C is not detected, it can be recognized that the last detected bar code 14C corresponds to the last image frame.

The operation of the present embodiment will be explained hereinafter.

After the negative film 514 is photographed, a customer withdraws the negative film 514 (the cartridge 16) from the camera 510 and requests development of and prints from the negative film 514 at a DPE shop. The negative film 514 is sent from the DPE shop to a processing laboratory. At the laboratory, the negative film 514 is first developed and then placed at a predetermined position of the photographic printing device 512. The cartridge 16 is loaded in the photographic printing device 512, and when the withdrawal of the leading end of the negative film 514 is completed, the conveyance of the negative film 514 is started. Namely, the driving portion 58 is driven by the control of the controller 556 and the negative film 514 is conveyed in the direction of arrow A in FIG. 11 by the rotation of the driving roller 58A.

At a time in which the leading side perforation 24A the image frame 14A and the rear side perforation 24B the image frame 14A provided after the above-mentioned image frame 14A are simultaneously detected while the film is conveyed, the image frame 14A can be detected by the CCD sensor 74. Here, the image frame 14A is positioned at the printing position at the third step. Because the conveying distance of the three steps is determined in advance, the image frame 14A can be easily positioned.

When the predetermined image frame 14A reaches the printing position, the solenoid 60 is driven so as to hold, press and contact the negative film 514 at the printing position.

In this state, the shutter 68 is opened and the respective filters 62 of C, M, Y appear are inserted in the optical path in accordance with the amount of exposure. The light which has transmitted through the negative film 514 is illuminated onto the photographic printing paper 66 via the lens 64, and images are printed on the photographic printing paper Next, the conveyance of the negative film 514 is resumed. In a case in which the images are successively recorded, the print processing is effected while the frames are repeatedly forwarded every one step. In a case in which the print processing is completed, i.e., the print processing of the last image frame 14A is completed, the rewinding of the negative film 514 in the cartridge 16 is effected.

In a case in which the last image frame 14A is recognized, if, for example, all of the lengths of the negative films 514 are uniform and the number of sheets of the film which can be photographed is constant, it suffices if the number of print processing, the number of the frames which are forwarded and the like are counted. However, there is a case in which the length of the negative film 514 is different, or a case in which the negative film 514 is not photographed to the end and is rewound in the cartridge 16.

Consequently, it is necessary to recognize the last image frame by certain means. Procedures for recognizing the last image frame 14A will be explained hereinafter.

(1) The existence of the image is always detected by the CCD sensor 74. Accordingly, in a case in which the existence of the image is detected and it is determined that the image does not exist in the area onto which the image is to be recorded, the image frame 14A, which is one frame in advance of the area onto which the image is recorded, is recognized as the last image frame.

(2) In the above-described procedure (1), in a case in which one frame is advanced without exposure, the image frame 14A which is one frame in advance of the area to which the image is advanced without exposure can be determined as the last image frame. Accordingly, in a case in which it is determined successively that the images do not exist in the areas of two frames, the image frame 14A, which is two frames in advance of the area onto which the image is recorded, is recognized as the last image frame.

(3) After the existence of the image is detected by the CCD sensor 74 and it is determined that the image does not exist in the area onto which the image is recorded, there is a case in which the perforations 24A and 24B can not be simultaneously detected even after the predetermined time (the time to which one frame is conveyed) has passed. In this case, the image frame which is determined by the CCD sensor 74 to be the last image frame is recognized as the last image frame.

(4) After the existence of the image is detected by the CCD sensor 74 and it is determined that the image does not exist in the area onto which the image is to be recorded, and moreover, the bar code 14C which corresponds to the image frame 14A has passed over the bar code sensor 530, there is a case in which the next bar code 14C cannot be detected even after the predetermined time (the time to which one image frame is conveyed) has passed. In this case, the image frame which is determined by the CCD sensor 74 to be the last image frame is recognized as the last image frame.

(5) In a case in which the perforations 24A and 24B are simultaneously detected by the perforation sensor 532, and thereafter, the next perforations 24A and 24B cannot be detected even after the predetermined time (the time to which one image frame is conveyed) has passed, the image frame 14A which corresponds to the last detected perforation 24B is recognized as the last image frame.

(6) In the procedure (5), it is possible that the perforations 24A and 24B which correspond to the last image frame do not exist. Accordingly, in a case in which the perforations 24A and 24B are simultaneously detected by the perforation sensor 532, and thereafter, the next perforations 24A and 24B cannot be detected even after the time to which two frames are conveyed, the image frame 14A which corresponds to the last detected perforation 24A is recognized as the last image frame, (7) There is a case in which the perforations 24A and 24B are simultaneously detected by the perforation sensor 532, and thereafter, the next perforations 24A and 24B cannot be detected even after the predetermined time (the time to which one image frame is conveyed) has passed. Moreover, there is a case in which after the bar code 14C which corresponds to the image frame 14A has passed over the bar code sensor 530, the next bar code 14C cannot be detected even after the predetermined time (the time to which one image frame is conveyed) has passed. In these cases, the image frame 14A which corresponds to the last detected perforation 24A is recognized as the last image frame.

(8) There is a case in which after the existence of the image is detected by the CCD sensor 74 and it is determined that the image does not exist in the area onto which the image is to be recorded, the perforations 24A and 24B cannot be simultaneously detected even after the predetermined time (the time to which one frame is conveyed) has passed. Also, there is a case in which after the bar code 14C which corresponds to the image frame 14A has passed over the bar code sensor 530, the next bar code 14C cannot be detected even after the predetermined time (the time to which one image frame is conveyed) has passed. In these cases, the image frame 14A which corresponds to the last detected perforation 24A is recognized as the last image frame.

(9) There is a case in which after the bar code 14C which corresponds to the image frame 14A has passed over the bar code sensor 530, the next bar code 14C cannot be detected even after the predetermined time (the time to which one frame is conveyed) has passed. In this case, the image frame 14A which corresponds to the last detected bar code 14C is recognized as the last image frame.

In the above-described procedures (1) through (9), two types of determinations are used or the same determination is repeated twice. By using the two types of determinations or by repeating the same determination in this way, the following erroneous determination can be prevented.

Namely, in a case in which a determination is made only by the density of the image, it is difficult to determine the existence of the image when the transmittance density of the image is low, such as, photography of a night view, a starry sky, fireworks, extremely underexposure or the like. In addition, the light fog may occur after the last image frame. Therefore, there is a possibility that the erroneous determination is made that the image exists.

On the other hand, in a case in which a determination is made only by the perforations 24A and 24B, there is a possibility that the perforation is erroneously determined since the transverse direction end portion of the negative film 514 beyond the last image frame is scratched.

Further, in a case in which a determination is made only by the bar code 14C, when the light fog occurs at the recording portion of the bar code 14C or after the last image frame, the signal cannot be read and the bar code is erroneously determined.

In this way, in the present embodiment, on the basis of the detection signals of the perforation sensor 532 which detects the perforations 24A and 24B, of the CCD sensor 74 which detects the existence of the image, and of the bar code sensor 530 which detects the bar code 14C recorded in advance onto the negative film 514, the last image frame is recognized. After the last image frame 14A is print processed at the printing position, the negative film 514 is immediately rewound in the cartridge 16. Consequently, in a case in which the negative film 514 is print processed without separating the negative film 514 from the cartridge 16, excessive force is not applied to the engaging portion between the spool 16A of the cartridge 16 and the negative film 514, and the damages to the engaging portion or the like can be avoided.

In the present embodiment, the last image frame 14A is recognized by using the information (the perforations 24A and 24B, the image frame 14A, the bar code 14C) which is recorded in advance onto the negative film 514. However, by recording in advance the number of sheets of the film to be photographed onto the magnetic recording layer 525, for example, and by reading the information and simply counting the number of print processed films or the number of forwarded frames, the last image frame 14A can be easily recognized.

In addition, in a case in which the tension of the negative film 514 is detected and the tension is more than the predetermined value, it is determined that the negative film 514 is entirely withdrawn. In this case, the negative film 514 may be rewound in the cartridge 16.

Further, a mark which denotes the last image frame 14A may be newly placed by the camera 510 in a vicinity of the last image frame 14A. Alternatively, a mark which specifies the last image frame 14A may be placed before or after the developing processing. Before the development, an optical mark may be placed. After the development, a cut-out mark or the like may be placed.

What is claimed is:

1. An apparatus for conveying a photographic film, in which the photographic film incudes perforations formed at predetermined intervals and a predetermined number of perforations are provided with respect to the area of one image frame, the photographic film, in which respective images are photographed so that relative positions between the perforation and the image are constant, is conveyed so that said image frames are successively positioned at a predetermined position, comprising:

a conveying device which conveys said photographic film in a longitudinal direction;

a perforation detection sensor which detects said perforations;

a recognizing device which, on the basis of the positions of the perforations detected by said perforation detection sensor, recognizes the image frame position onto which the image is to be recorded;

an image frame determining device which determines whether an image exists in the image frame at the position onto which said image is to be recorded; and a controller which, when the perforations corresponding to an empty image frame recording area, which is determined by said image frame determining device to not have an image frame, are detected by said perforation detection sensor, controls the conveying device such that positioning of said empty image frame recording area at said predetermined position is canceled and the conveying device advances the film to a next image frame.

2. An apparatus for conveying a photographic film according to claim 1, wherein, when the perforations corresponding to a full image frame recording area, which is determined by said image frame determining device to have an image, are detected by said perforation detection sensor, said controller controls the conveying device such that positioning of the said full image frame recording area at said predetermined position is effected.

3. An apparatus for conveying a photographic film according to claim 1, wherein said image frame determining device extends linearly in the transverse direction of said photographic film and includes a CCD sensor which detects density of said photographic film.

4. An apparatus for conveying a photographic film according to claim 1, further comprising a recording device which records onto a recording medium information indicating said image does not exist, on the basis of the perforations which correspond to the image frame recording area, when an empty image frame recording area is determined to exist by said image frame determining.

5. An apparatus for conveying a photographic film according to claim 4, wherein said recording medium is a magnetic recording layer provided on said photographic film.

6. An apparatus for conveying a photographic film according to claim 4, wherein said recording medium is a memory card which is conveyed together with said photographic film to the respective processes for operation of said photographic film.

7. An apparatus for conveying a photographic film according to claim 1, wherein one of said perforations is provided at the transverse direction end portion of said photographic film, which corresponds to the respective longitudinal end portions of said photographic film in said image frame recording area.

8. An apparatus for conveying a photographic film, in which the photographic film incudes perforations formed therein at predetermined intervals and in which a predetermined number of perforations is provided with respect to the area of one image frame, the photographic film, in which respective images are photographed so that relative positions between the perforation and the image are constant, is conveyed, comprising:

a conveying device which conveys said photographic film in a longitudinal direction;

a perforation detection sensor which detects said perforations;

a recognizing device which, on the basis of the positions of the perforations detected by said perforation detection sensor, recognizes a position onto which the image is to be recorded;

an image frame determining device which determines whether an image exists at the position onto which said image is to be recorded; and a recording device which records information indicating that said image does not exist onto a recording medium on the basis of the detected perforations corresponding to the image frame recording area which is determined to not have an image.

9. An apparatus for conveying a photographic film according to claim 8, wherein said recording medium is a magnetic recording layer provided on said photographic film.

10. An apparatus for conveying a photographic film according to claim 8, wherein said recording medium is a memory card which is conveyed together with said photographic film to the respective processes for operation of said photographic film.

11. An apparatus for conveying a photographic film according to claim 8, wherein said image frame determining device extends linearly in the transverse direction of said photographic film and includes a CCD sensor which detects density of said photographic film.

12. An apparatus for conveying a photographic film according to claim 8, wherein one of said perforations is provided at the transverse direction end portion of said photographic film, which corresponds to the respective longitudinal end portions of said photographic film in said image frame recording area.

13. An apparatus for conveying a photographic film, in which the photographic film includes perforations formed at predetermined intervals and in which a predetermined number of perforations is provided with respect to one image frame, a cartridge is loaded such that the photographic film, in which respective images are photographed so that relative positions between the perforation and the image are constant, is wound in layers and is accommodated in a state in which an inner portion of the photographic film is engaged with a spool, an outer end portion of the photographic film is withdrawn from the cartridge and is advanced so that said image frames are successively positioned at a predetermined position, said apparatus comprising:

a conveying device which conveys said photographic film in a longitudinal direction;

a perforation detection sensor which detects said perforations, an image frame determining device which, on the basis of the position of the perforation detected by said perforation detection sensor, determines whether an image frame exists at the position onto which the image is to be recorded, and a mark detection device which detects a designation mark which is applied in advance to the photographic film and which designates a position onto which the last image frame is to be recorded;

a recognizing device which recognizes a position of the last image frame based on the condition of the existence of the image frame and the count value of the perforation; and a prohibiting device in which the conveyance of the photographic film by said conveying device from the cartridge in the withdrawing direction of the photographic film is prohibited based on recognition by said recognizing device, such that the last image frame which was recognized by said recognizing device does not go beyond the predetermined position.

14. An apparatus for conveying a photographic film according to claim 13, wherein said image frame determining device includes a CCD sensor which detects density of said image frame.

15. An apparatus for conveying a photographic film according to claim 13, wherein said photographic film includes optically readable information at a transverse direction end portion of said photographic film corresponding to each of said image frames, and said apparatus for conveying a photographic film further includes a reading device which optically reads said information.

16. An apparatus for conveying a photographic film according to claim 15, wherein said reading device is a bar code sensor.

* * * * *